Patented Aug. 24, 1937

2,090,620

UNITED STATES PATENT OFFICE 2,090,620

METHOD OF SEPARATING CINEOLS FROM HYDROCARBONS OF SIMILAR BOILING RANGE

Carlisle H. Bibb, Pensacola, Fla., assignor to Newport Industries, Inc., Pensacola, Fla., a corporation of Delaware No Drawing. Application September 8, 1936, Serial No. 99,873

14 Claims. (Cl. 202—41)

This invention relates to a method of separating cineols from hydrocarbons of similar boiling range to recover relatively pure cineol from such mixture.

In the processes for the manufacture of cineol by dehydrating terpin hydrate, or by isomerizing terpineol, a certain amount of hydrocarbons is formed. Such hydrocarbons have a boiling range from 172° C. to about 188° C. Since the boiling range of the cineols produced lies within this range, namely between about 172° C. and 176° C., it is practically impossible to separate the cineols from the hydrocarbons by fractional distillation. Cineol and terpene hydrocarbons are also by-products of the manufacture of terpene hydrates from turpentine and may coexist along with other hydrocarbons used in the manufacture of turpentine. A part of these hydrocarbons usually have the same boiling range as the cineols, so that the purification of the cineol by ordinary fractional distillation is not feasible.

I have now found that a mixture of a cineol and hydrocarbons having a similar boiling range can be fractionally distilled to recover the cineol and hydrocarbons if there is added to the mixture prior to or during distillation a phenolic body having a substantially different boiling point from said boiling range. It appears that the phenolic body used forms a loose addition compound with the cineol present and this compound having some slight stability in the earlier stages of distillation enables a fractional distillation to be carried out. It is thus possible to fractionate off the hydrocarbons and after their removal, as the temperature in the still rises, to distill off the cineol from the phenolic body. The fractional distillation is preferably carried out under reduced atmospheric pressure, although other pressures may be utilized at which the ratio of cineols to hydrocarbons is different in the distillate from the ratio in the distilling liquid.

It is therefore an important object of this invention to provide a method for the separation of cineols from hydrocarbons of similar boiling range, whereby both the cineols and the hydrocarbons can be recovered in substantially pure state.

It is a further important object of this invention to provide a method of separating cineols from hydrocarbons of similar boiling range by the addition to the mixture thereof of a phenolic body having a substantially different boiling point from said boiling range and having the property of loosely combining with the cineols to permit the fractional distillation of the hydrocarbons first, followed by the distillation of the cineols from the phenolic body employed.

It is a further important object of this invention to provide a cyclic process for the separation of cineols from hydrocarbons of similar boiling range by the addition to such mixture of a phenolic body of substantially higher boiling point than said boiling range, whereby distillate fractions containing relatively pure hydrocarbons, mixtures of the hydrocarbons and cineols, and relatively pure cineols, respectively, may be obtained and said intermediate mixture containing hydrocarbons and cineols may be recycled to recover further quantities of relatively pure cineols and hydrocarbons.

Other and further important objects of this invention will become apparent from the following description and appended claims.

The process of this invention is applicable to the separation of both 1.8 and 1.4 cineol, or mixtures thereof, from hydrocarbons of similar boiling range with which such cineols are usually associated as a result of the method by which they are manufactured. A method of the present invention for the separation of cineols from such hydrocarbons includes the addition to the mixture of cineols and hydrocarbons of a phenolic body having a substantially different boiling point from the boiling range of the mixture and having the property of loosely combining with the cineols to form an addition compound from which the cineols can be distilled and recovered in relatively pure state.

In general a substance of a phenolic character having a substantially higher boiling point than the boiling range of the mixture of cineols and hydrocarbons can be employed. The use of meta- or para-cresol, or the commonly available mixtures of meta- and para-cresols, is preferred, since each of these cresols and mixtures thereof have substantially higher boiling points than the boiling range of the cineols and hydrocarbons. A mixture of meta- and para-cresol, for instance, is especially well suited to the process of separating cineols from the terpene hydrocarbons that are formed with the cineols in the dehydration of terpene hydrates and in the hydration of terpineol or pinene, and also in separating cineols from other hydrocarbons of similar boiling range.

Examples of other substances of a phenolic character that are applicable to my present process include carvacrol, thymol, resorcinol, naphthols, xylenols, and the like. Phenol itself, or carbolic acid, is not well suited to the process because its boiling point is too near that of the cineols, and ortho cresol, although workable, is likewise difficult to handle for the same reason. The choice of phenolic substance depends, therefore, on the boiling range of the hydrocarbons to be separated from the cineols.

By the term "phenolic body" or "phenolic substance" is meant an aromatic compound having one or more hydroxyl groups replacing one or more hydrogen atoms of the aromatic hydrocarbon nucleus only, which compound may also have one or more alkyl groups as the only other substituent replacing another or other hydrogen atoms of said nucleus.

My process is adaptable to the separation of either of the cineols, or mixtures thereof, from any hydrocarbon of similar boiling range, including both aliphatic and aromatic hydrocarbons. The following will serve as an example of a preferred method of separating cineols from a cineol-hydrocarbon mixture containing about 60% of cineol, or such as is obtained as a hydrocarbon fraction in the dehydration of terpene hydrates to terpineol:

*Example No. 1*

To 800 parts by volume of such a cineol-hydrocarbon mixture are added 1200 parts by volume of a mixture of meta- and para-cresol. The resulting mixture is put in a vacuum fractionating still and subjected to distillation under an absolute pressure of about 20 m. m. of mercury. The following results are typical:

| Character of distillate | Temp. at top of column °C. | Volume of distillate fraction | Pressure m. m. of Hg | Sp. Gr. 15/4 | Refractory index at 20° C. |
|---|---|---|---|---|---|
| Hydrocarbons | 70 | 240 | 19 | .8651 | 1.4655 |
| Intermediates | 71 | 240 | 19 | .8895 | 1.4605 |
| Cineols | 74 | 260 | 19 | .9080 | 1.4564 |

The residue left in the still amounts to about 1240 parts by volume of nearly pure cresol, which is entirely suitable for another run in place of fresh cresol, thus making the cresol loss very small and the process economical as regards its use.

*Example No. 2*

To 800 parts by volume of a cineol-hydrocarbon mixture are added 1200 parts by volume of liquefied resorcinol. The resulting mixture is put in a vacuum fractionating still and subjected to distillation at about 29 m. m. absolute pressure. The following results are typical:

| Character of distillate | Temp. at top of column °C. | Volume of distillate fraction | Pressure m. m. of Hg | Sp. Gr. 15/4 | Refractory index at 20° C. |
|---|---|---|---|---|---|
| Hydrocarbons | 79 | 120 | 28 | .8664 | 1.4678 |
| Intermediates | 79 | 280 | 28 | .8840 | 1.4600 |
| Cineols | 85 | 340 | 29 | .9042 | 1.4535 |

The residue left in the still can be re-used, without purification, for another run in like manner.

It will thus be seen that the process consists in fractionating off the hydrocarbons from a mixture of hydrocarbons, cineols and a phenolic substance whose boiling point is substantially above that of the hydrocarbon-cineol mixture. Then, as the temperature advances in the still, the hydrocarbons being removed, the cineols are distilled off from the phenolic substance. As previously stated, there is apparently a tendency for the cineol to form a loose compound or addition product with the phenolic substance which is just stable enough to permit the separation of the hydrocarbons under distillation conditions, but sufficiently unstable to permit the cineols to be distilled off from the phenolic substance as the temperature rises. Except for a gradual rise in temperature in the distilling liquid and the removal of the hydrocarbons, there is practically no noticeable change in the conditions for bringing over the cineols.

Other ratios than that shown in the foregoing examples as to parts by volume of the phenolic substance to the cineol-hydrocarbon mixture may be used with good results. If less of the cineols are present, less of the phenolic substance is required. The ratio is arbitrary, but different ratios result in somewhat different ratios of the distilled product. In general, ratios of from 1 to 1 to 3 to 1 by volume of the phenolic substance to the cineol-hydrocarbon mixtures are satisfactory.

The operativeness of the process is not limited to the temperature and corresponding pressure shown in the foregoing examples, but the process can be conducted at other pressures at which the ratio of cineols to hydrocarbons is different in the distillate from what it is in the distilling liquid. The conditions of temperature and pressure may also be varied during the process, as for example, one set of conditions may be maintained while separating the hydrocarbons and another set of conditions while recovering the cineol fractions. Also, as previously indicated, the process gives good results whether 1.8 cineol, or its isomer 1.4 cineol, or a mixture of both, is present.

I am aware that numerous details of the process may be varied through a wide range without departing from the principles of this invention, and I, therefore, do not purpose limiting the patent granted hereon otherwise than necessitated by the prior art.

I claim as my invention:

1. The method of separating cineols from hydrocarbons of similar boiling range, which comprises distilling a mixture of a cineol and hydrocarbons of similar boiling range in the presence of a phenolic body having a higher boiling range.

2. The method of separating cineols from hydrocarbons of similar boiling range, which comprises distilling a mixture of a cineol and hydrocarbons of similar boiling range in the presence of meta-cresol.

3. The method of separating cineols from hydrocarbons of similar boiling range, which comprises distilling a mixture of a cineol and hydrocarbons of similar boiling range in the presence of para-cresol.

4. The method of separating cineols from hydrocarbons of similar boiling range, which comprises distilling a mixture of a cineol and hydrocarbons of similar boiling range in the presence of a mixture of meta- and para-cresols.

5. The method of separating cineols from hydrocarbons of similar boiling range, which comprises distilling a mixture of a cineol and hydrocarbons of similar boiling range in the presence of resorcinol.

6. The method of separating a cineol from hydrocarbons of similar boiling range, which comprises subjecting to fractional distillation a mixture of a cineol, hydrocarbons of similar boiling range and a phenolic body of substantially higher boiling point than said range and recovering said cineol in a separate distillate fraction.

7. The method of separating a cineol from hydrocarbons of similar boiling range, which comprises subjecting to fractional distillation a mixture of a cineol, hydrocarbons of similar boiling range and cresols substantially free from ortho-cresol, and recovering said cineol in a separate distillate fraction.

8. The method of separating a cineol from hydrocarbons of similar boiling range, which comprises subjecting to fractional distillation a mixture of a cineol, hydrocarbons of similar boiling range and resorcinol and recovering said cineol in a separate distillate fraction.

9. The method of separating a cineol from hydrocarbons of similar boiling range, which comprises subjecting a mixture of cineol, hydrocarbons of similar boiling range and a phenolic body of substantially higher boiling point than said range to fractional distillation under subatmospheric pressure and separating a distillate fraction containing hydrocarbons, a second distillate fraction containing an intermediate mixture of hydrocarbons and cineol, and a third distillate fraction containing principally pure cineol.

10. The method of separating a cineol from hydrocarbons of similar boiling range, which comprises subjecting a mixture of cineol, hydrocarbons of similar boiling range and a mixture of meta- and para-cresols to fractional distillation under subatmospheric pressure and separating a distillate fraction containing hydrocarbons, a second distillate fraction containing an intermediate mixture of hydrocarbons and cineol, and a third distillate fraction containing principally pure cineol.

11. The method of separating a cineol from hydrocarbons of similar boiling range, which comprises subjecting a mixture of a cineol, hydrocarbons of similar boiling range and resorcinol to fractional distillation under subatmospheric pressure and separating a distillate fraction containing hydrocarbons, a second distillate fraction containing an intermediate mixture of hydrocarbons and cineol, and a third distillate fraction containing principally pure cineol.

12. The method of separating a cineol from hydrocarbons of similar boiling range, which comprises subjecting a mixture of a cineol, hydrocarbons of similar, boiling range and a phenolic body of substantially higher boiling point than said range to fractional distillation under subatmospheric pressure, separating a distillate fraction containing hydrocarbons, a second distillate fraction containing an intermediate mixture of hydrocarbons and cineol, and a third distillate fraction containing principally pure cineol, mixing said intermediate mixture with a further quantity of said phenolic body and again fractionally distilling to recover cineol from said mixture.

13. The method of separating a cineol from hydrocarbons of similar boiling range, which comprises subjecting a mixture of a cineol, hydrocarbons of similar boiling range and a cresol other than ortho-cresol to fractional distillation under subatmospheric pressure and separating a distillate fraction containing hydrocarbons, a second distillate fraction containing an intermediate mxture of hydrocarbons and cineol, and a third distillate fraction containing principally pure cineol, and re-using the residue from said distillation in place of fresh cresol in subsequent similar distillations.

14. The method of separating a cineol from hydrocarbons of similar boiling range, which comprises subjecting a mixture of a cineol, hydrocarbons of similar boiling range and resorcinol to fractional distillation under subatmospheric pressure and separating a distillate fraction containing hydrocarbons, a second distillate fraction containing an intermediate mixture of hydrocarbons and cineol, and a third distillate fraction containing principally pure cineol, and re-using the residue from said distillation in place of fresh resorcinol in subsequent similar distillations.

CARLISLE H. BIBB.